(12) United States Patent
Su

(10) Patent No.: US 9,179,202 B1
(45) Date of Patent: Nov. 3, 2015

(54) MULTIPLE-FREQUENCY SIGNAL CLASSIFICATION THROUGH USE OF A SECOND-ORDER STATISTIC

(71) Applicant: The United States of America, as represented by the Secretary of the Army, Washington, DC (US)

(72) Inventor: Wei Su, Bel Air, MD (US)

(73) Assignee: The United States of America, as represented by the Secretary of the Army, Washington, DC (US)

(*) Notice: Subject to any disclaimer, the term of this patent is extended or adjusted under 35 U.S.C. 154(b) by 106 days.

(21) Appl. No.: 14/027,433

(22) Filed: Sep. 16, 2013

(51) Int. Cl.
*H04Q 1/45* (2006.01)

(52) U.S. Cl.
CPC ........................................ *H04Q 1/45* (2013.01)

(58) Field of Classification Search
CPC ................. H04Q 2213/13405; H04Q 1/45
USPC ................................................. 379/283
See application file for complete search history.

(56) References Cited

U.S. PATENT DOCUMENTS

| 4,087,638 | A | * | 5/1978 | Hayes et al. | ............ 455/564 |
| 8,477,976 | B2 | | 7/2013 | Sheikh | |
| 2002/0080954 | A1 | * | 6/2002 | Felder et al. | ............ 379/386 |
| 2005/0063532 | A1 | | 3/2005 | Kim | |

* cited by examiner

Primary Examiner — Antim Shah
(74) Attorney, Agent, or Firm — Azza Jayaprakash

(57) ABSTRACT

A multi-frequency (also known as multiple-frequency) signal, such as a dual-tone signal, can be a repeating signal that indicates a character designated on a keypad. The signal can be processed such that the character is identifiable. This processing can include using first and second-order statistics of the signal to determine an estimated average frequency of the signal. A table can be accessed that lists individual characters of the keypad and specific average frequency values can be associated with the individual characters. The specific average frequency value that is closest to the estimated average frequency can be identified and the character associated with this closest specific average frequency value can be appointed as the character indicated by the signal. Thus, the multi-frequency signal can be classified as communicating the appointed character.

20 Claims, 17 Drawing Sheets

# US 9,179,202 B1

MULTIPLE-FREQUENCY SIGNAL CLASSIFICATION THROUGH USE OF A SECOND-ORDER STATISTIC

GOVERNMENT INTEREST

The innovation described herein may be manufactured, used, imported, sold, and licensed by or for the Government of the United States of America without the payment of any royalty thereon or therefore.

BACKGROUND

A transmitter can send out a communication signal. A receiver that receives the communication signal, whether the receiver is a receiver intended by the transmitter or not, can attempt to process the communication signal. Processing of this signal can be a relatively long process. Further, if a specific piece of information is desired from the signal, then it can be considered resource intensive to decode the whole single for the piece of information.

SUMMARY

A system is disclosed comprising an identification component configured to identify an average frequency of a multi-frequency signal. The system also comprises a determination component configured to determine a data set associated with the multi-frequency signal through use of the average frequency, where the data set is outputted and where the identification component, the determination component, or a combination thereof is, at least in part, implemented through non-software.

Another system is disclosed comprising a computation component, a correlation component, a causation component, and a processor. The estimation component can be configured to make an estimation of an average of a high frequency of a dual-tone frequency signal and a low frequency of the dual-tone frequency signal, where the estimation is made through use a second-order statistic of the dual-tone frequency signal. The correlation component can be configured to make a correlation of the average with a character. The causation component can be configured to cause an output of the character. The processor can be configured to execute at least one instruction associated with the computation component, the correlation component, the causation component, or a combination thereof.

Yet another system is disclosed comprising a non-transitory computer-readable medium configured to store processor-executable instructions that when executed by a processor cause the processor to perform a method. The method can comprise correlating an estimated average frequency of a dual-tone frequency signal with a key of a digital communication keypad, where the dual-tone frequency signal comprises a high frequency and a low frequency that is different from the high frequency and where the average frequency is an average of the high frequency and the low frequency. The method can additionally comprise causing an output of the key after the correlation.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
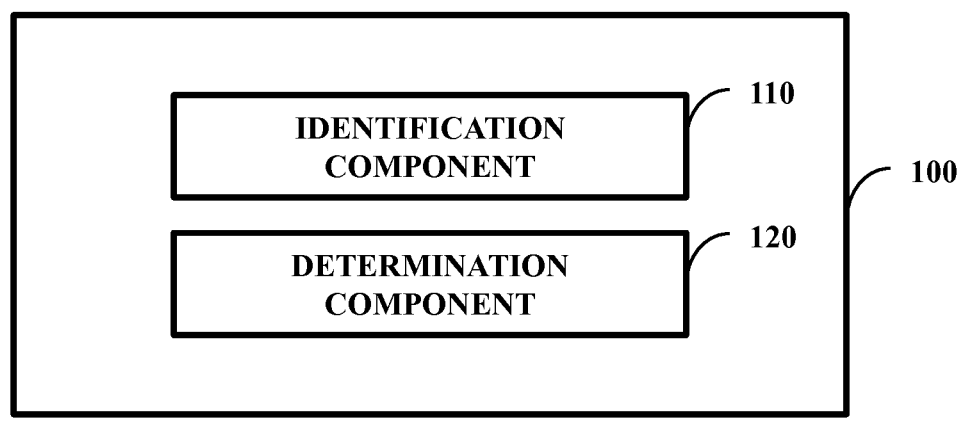
FIG. 1 illustrates one embodiment of a system comprising an identification component and a determination component.

A multi-frequency (also known as multiple-frequency) signal, such as a dual-tone signal, can be a repeating signal that indicates a character designated on a keypad. The signal can be processed such that the character is identifiable. This processing can include using first and second-order statistics of the signal to determine an estimated average frequency of the signal. A table can be accessed that lists individual characters of the keypad and specific average frequency values can be associated with the individual characters. The specific average frequency value that is closest to the estimated average frequency can be identified and the character associated with this closest specific average frequency value can be appointed as the character indicated by the signal. Thus, the multi-frequency signal can be classified as communicating the appointed character.

Aspects disclosed herein can be related to communications and signal detection. Aspects can be used to detect a dual-tone multi-frequency or other signal used for synchronizing patterns and preambles preceding user data in data communications protocols, signaling information in telephony as well as radio communications, supervisory audio tones in cellular telephony, predefined bit sequences on a specific channel that provides phase reference of other associated channels, etc.

In one example, a system can be is transmitting voice, data, image or video. Embedded in this signal can be one or more synchronizing patterns which identify the beginning of a frame, or form a preamble to user data, a predefined bit sequence that provides a timing reference, signaling information, etc. These synchronizing signals can be, at least in part, a dual-tone multi-frequency signal. Aspects disclosed herein can be used to detect the dual-tone multi-frequency signal without decoding the signal.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising an identification component 110 and a determination component 120. In one embodiment, the identification component 110, the determination component 120, or a combination thereof is, at least in part, implemented through non-software (e.g., implemented through hardware, implemented through a combination of hardware and software, the identification component 110 is implemented through software while the determination component 120 is implemented through hardware, etc.). The identification component 110 can be configured to identify an average frequency of a multi-frequency signal, such as a dual-tone multi-frequency signal. In one embodiment, identification comprises estimating the average frequency through use of a first-order statistic and a second-order statistic. In one embodiment, identification comprises accessing an already calculated average frequency (e.g., that is stored in a computer-readable medium). In one embodiment, identification comprises determining a high frequency and a low frequency of the multi-frequency signal and then taking the average of the two frequencies.

The determination component 120 can be configured to determine a data set (e.g., a piece of information) associated with the multi-frequency signal through use of the average frequency and the system 100 can output the data set. In one embodiment, the data set (e.g., one or more pieces of data) can be a key of a telephone number pad (e.g., 0-9, A-D, *, and #). Different keys of the telephone number pad can associated with different average frequencies. Below is an example table of keys associated with different average frequencies as well as low and high frequencies that can produce a particular average frequency.

| Key | Low Frequency (in Hz) | High Frequency (in Hz) | Average Frequency (in Hz) |
|---|---|---|---|
| 1 | 697 | 1209 | 953 |
| 4 | 770 | 1209 | 990 |
| 7 | 852 | 1209 | 1031 |
| * | 941 | 1209 | 1075 |
| 2 | 697 | 1336 | 1017 |
| 5 | 770 | 1336 | 1053 |
| 8 | 852 | 1336 | 1094 |
| 0 | 941 | 1336 | 1139 |
| 3 | 697 | 1477 | 1087 |
| 6 | 770 | 1477 | 1124 |
| 9 | 852 | 1477 | 1165 |
| # | 941 | 1477 | 1209 |
| A | 697 | 1633 | 1165 |
| B | 770 | 1633 | 1202 |
| C | 852 | 1633 | 1243 |
| D | 941 | 1633 | 1287 |

The determination component 120 can access the table (e.g., where the table is retained in a computer-readable medium) and compare the average frequency that is identified to the average frequencies of the table to determine the correct key communicated by the multi-frequency signal.

In one embodiment, the multi-frequency signal is an information portion of a communication signal. In one embodiment, the multi-frequency signal is a synchronizing signal and a repeating signal. The multi-frequency signal can be a header of the communication signal. The header can contain identifying information of a sender of the communication signal, an indication of other information contained of the communication signal, identifying information of an intended recipient of the communication signal, etc.

Figure 2:
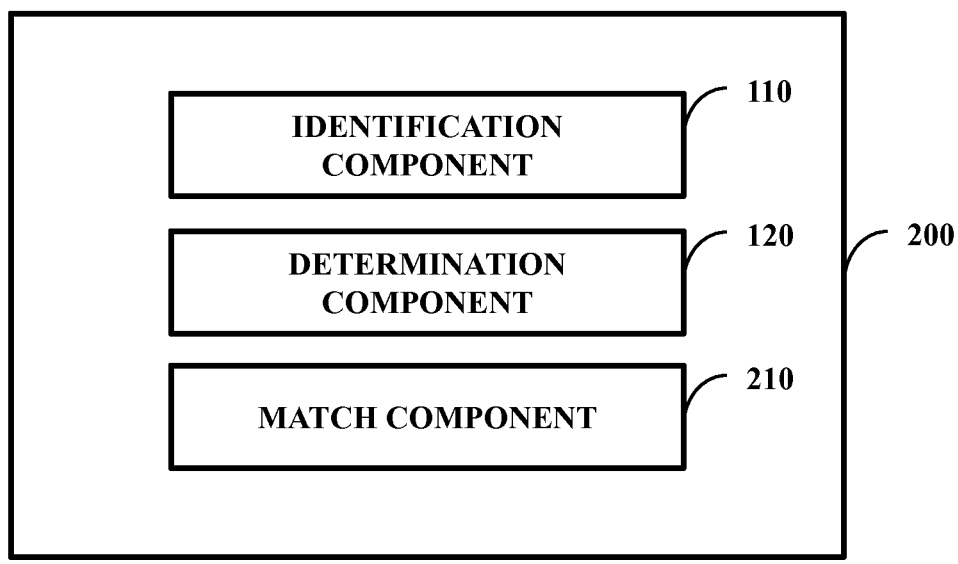
FIG. 2 illustrates one embodiment of a system comprising the identification component, the determination component, and a match component.

FIG. 2 illustrates one embodiment of a system 200 comprising the identification component 110, the determination component 120, and a match component 210. The match component 210 can be configured to match the average frequency with a best matching frequency of a frequency table (e.g., match the identified average frequency with a specific average frequency of the example table shown above). The determination component 120 can be configured to determine the data set associated with the multi-frequency signal through use of the best matching frequency.

In one embodiment, the best matching frequency is identical to the average frequency. For example, the average frequency can be 1087 Hz. This matches directly for the average frequency of the character '3' in the table above. In one embodiment, the best matching frequency is the nearest frequency to the average frequency, but not an exact match. For example, the average frequency can be 1093 Hz. Since this is closest to 1094 Hz, the average frequency in the example table for the character '8', then the match component 210 can designate the 1094 Hz as the best matching frequency for 1093 Hz. In turn, the determination component 120 can determine that the data set is the character '8.'

Figure 3:
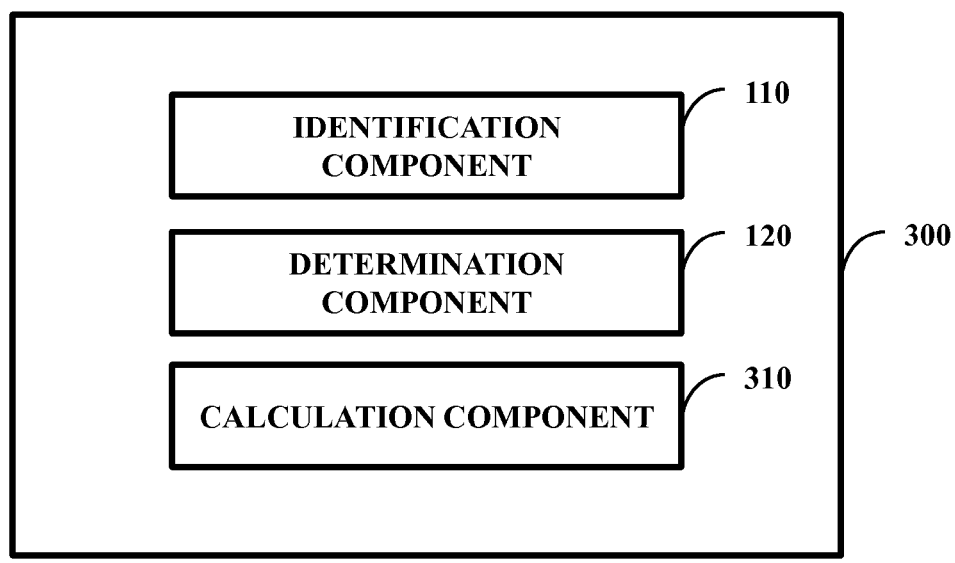
FIG. 3 illustrates one embodiment of a system comprising the identification component, the determination component, and a calculation component.

FIG. 3 illustrates one embodiment of a system 300 comprising the identification component 110, the determination component 120, and a calculation component 310. The calculation component 310 can be configured to calculate a first-order statistic for the multi-frequency signal and can be configured to calculate a second-order statistic of the multi-frequency signal. The identification component 110 can be configured to use the first-order statistic and the second-order statistic to identify the average frequency of the multi-frequency signal.

In one embodiment, the calculation component 310 can calculate the first-order statistic and that first-order statistic can include the high frequency and the low frequency of the multi-frequency signal. The calculation component 310 can also calculate the second-order statistic and that second-order statistic can include the high frequency, the low frequency, and an estimated average frequency. A mathematical operation, such as subtraction, can be performed with the first-order statistic and the second-order statistic to cancel out the low frequency and the high frequency such that the estimated average frequency is isolated and thus identified by the identification component 110.

Figure 4:
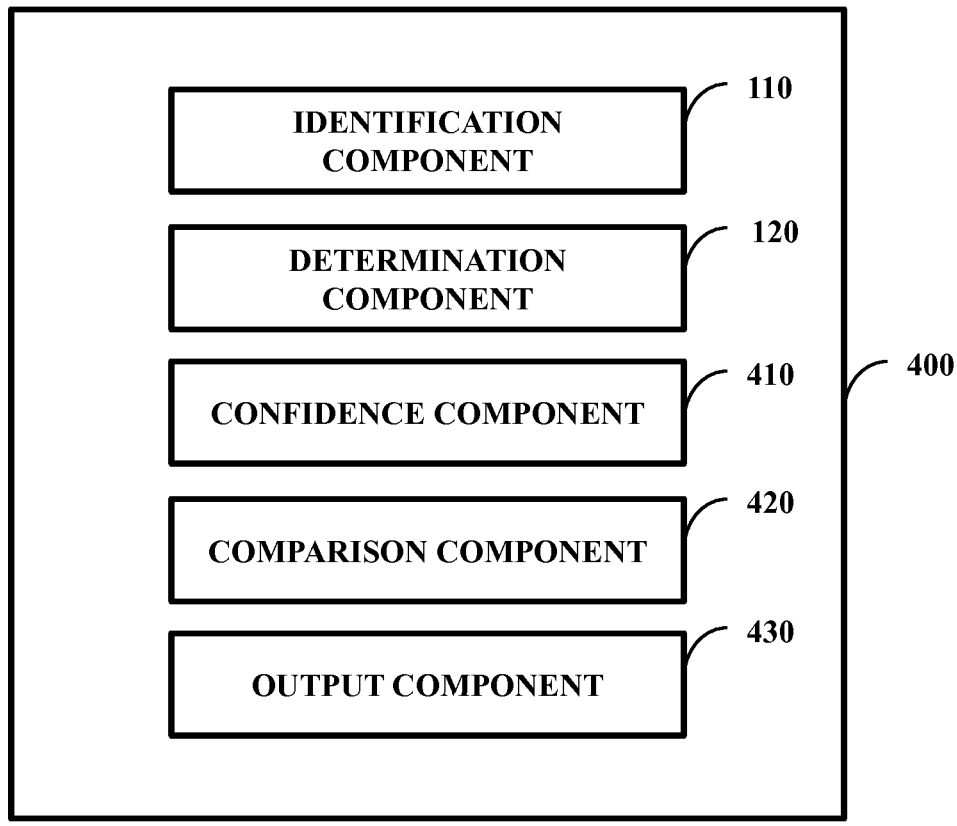
FIG. 4 illustrates one embodiment of a system comprising the identification component, the determination component, a confidence component, a comparison component, and an output component.

FIG. 4 illustrates one embodiment of a system 400 comprising the identification component 110, the determination component 120, a confidence component 410, a comparison component 420, and an output component 430. The confidence component 410 can be configured to determine a confidence level of the data set (e.g., data set itself, average frequency used to determine the data set, etc.) being correctly associated with the multi-frequency signal. The comparison component 420 can be configured to determine if the confidence level meets a threshold (e.g., reaches the threshold, surpasses the threshold, or does not exceed the threshold). The output component 430 can be configured to output the data set when the confidence level meets the threshold and configured to report a failure when the confidence level does not meet the threshold.

As discussed above, the average frequency of the multi-frequency signal may be determined through use of a second-order statistic and thus the average frequency can be an estimated average frequency. Since estimates can be used as opposed to accurate values, there may be a possibility that the average frequency identified by the identification component is not correct. In one example, an average frequency of 1042 Hz can be in between the average frequencies for '7' and '5.' In one embodiment, if the determination component 120 determines that the data set is '7' this may have low probability due to the closeness of the underlying average frequency to that of '5.' Therefore the output component 430 can produce an error report if the probability is too low, where probability is based on a result from the comparison component 420. In one embodiment, the output component 430 can output the data set along with an associated probability of being correct or output the data set.

In one embodiment, the identification component 110, the determination component 120, confidence component 410, and the comparison component 420 work in conjunction together. The identification component 110 can identify the average frequency. The comparison component 420 can compare the average frequency with the average frequencies of the example table and for the comparisons a correctness likelihood can be established. The confidence component 410 can identify a highest matching likelihood and/or likelihoods that meet a threshold and the results of this identification can be used by the determination component to determine the data set.

In one embodiment, the confidence component 410, comparison component 420, and/or output component 430 operate after operation of the identification component 110, but before operation of the determination component 120. In one example, the identification component 110 can identify the average frequency through estimation. At that point, the confidence component 410, comparison component 420, and/or the output component 430 can function with regard to a likelihood of the estimated average frequency being accurate. In one embodiment, the confidence component 410, comparison component 420, and/or the output component 430 operate after operation of the identification component 110 and the determination component 120. In one example, the confidence component 410, comparison component 420, and/or the output component 430 can function with regard to a likelihood of the data set determined being accurate.

Figure 5:
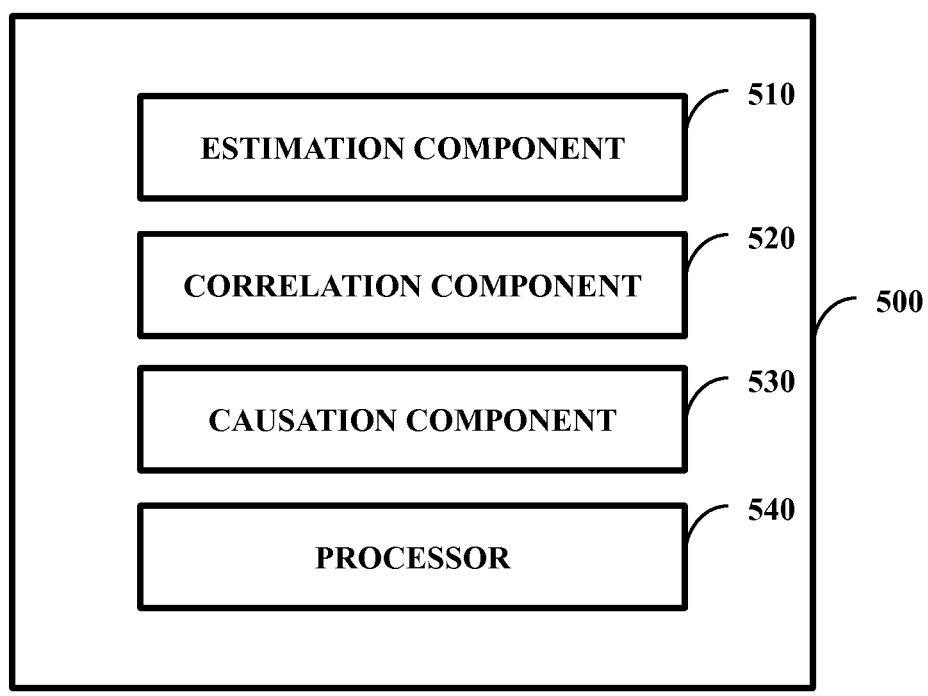
FIG. 5 illustrates one embodiment of a system comprising an estimation component, a correlation component, a causation component, and a processor.

FIG. 5 illustrates one embodiment of a system 500 comprising an estimation component 510, a correlation component 520, a causation component 530, and a processor 540. The estimation component 510 can be configured to make an estimation of an average of a high frequency of a dual-tone frequency signal and a low frequency of the dual-tone frequency signal, where the estimation is made through use a second-order statistic of the dual-tone frequency signal. The correlation component 520 can be configured to make a correlation of the average with a character. The causation component 530 can be configured to cause an output of the character. The processor 540 can be configured to execute at least one instruction associated with the estimation component 510, the correlation component 520, the causation component 530, or a combination thereof.

In one embodiment, the estimation component 510 estimates the average and then makes the average accessible to the causation component 520. The correlation component 520 can make the correlation through use of the example table discussed above as a look-up table, perform a query to determine a closest corresponding known average associated with a candidate character (e.g., individual keys of the key column of the table that can be appointed as the character), etc. In one example, the estimation component 510 estimates the average and then causes retention of the average in a computer-readable medium. The computer-readable medium can also retain the example table discussed above. The correlation component 520 can access the average and the example table from the computer-readable medium. The correlation component 520 can then find a closest counterpart of the average in the average frequency column of the example table. The correlation component 520 can determine the character that is associated with the closest counterpart and as such appoint that the character. The correlation component 520 can inform the causation component 530 of the appointed character and the causation component 530 can disclose the appointed character to an identified location.

Figure 6:
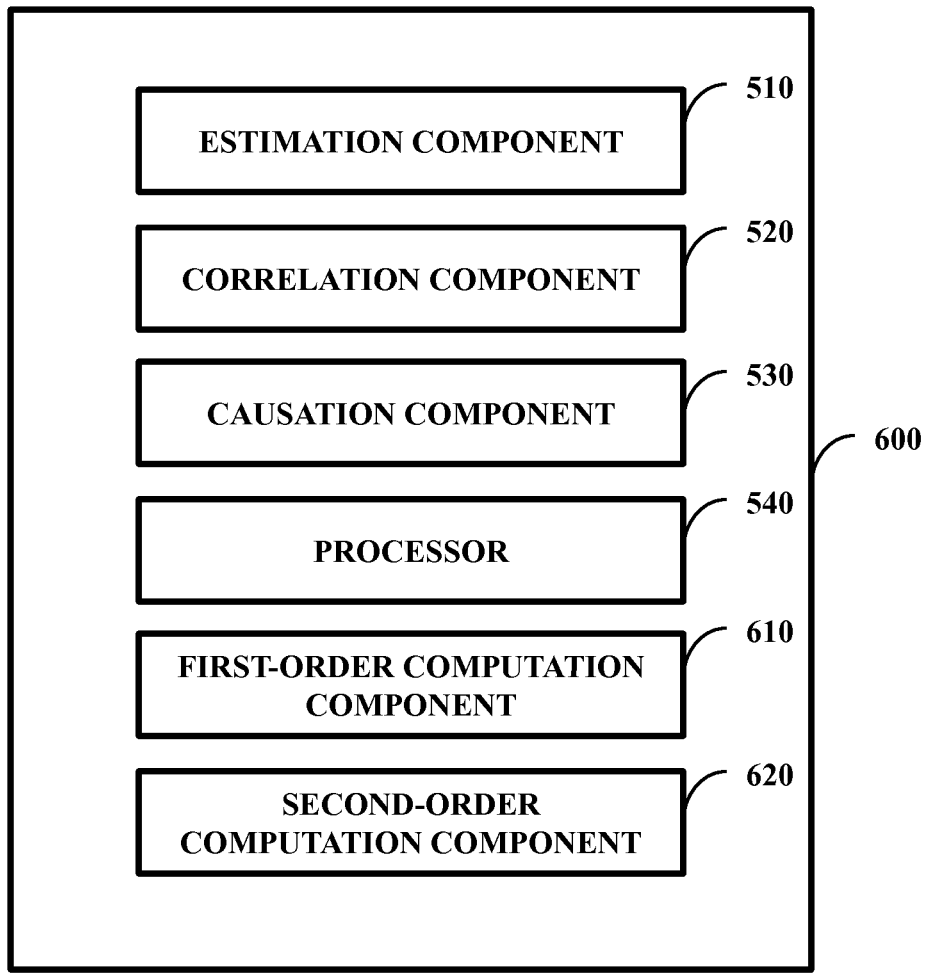
FIG. 6 illustrates one embodiment of a system comprising the estimation component, the correlation component, the causation component, the processor, a first-order computation component, and a second-order computation component.

FIG. 6 illustrates one embodiment of a system 600 comprising the estimation component 510, the correlation component 520, the causation component 530, the processor 540, a first-order computation component 610, and a second-order computation component 620. The first-order computation component 610 can be configured to compute a first-order statistic of the dual-tone frequency signal. The second-order computation component 620 can be configured to compute the second-order statistic of the dual-tone frequency signal. The estimation component 510 can be configured to perform a comparison (e.g., subtraction) with the first-order statistic and the second-order statistic. The estimation of the average by the estimation component 510 can be based, at least in part, on a result of the comparison and the correlation component 520 can correlate the average with the character. In one embodiment, the character can correlate to a key of a telephone number pad (e.g., 0-9, A-D, *, and #). In one embodiment, the dual-tone frequency signal is an information portion (e.g., header) of a communication signal. In one embodiment, the dual-tone frequency signal is a synchronizing signal and a repeating signal.

Figure 7:
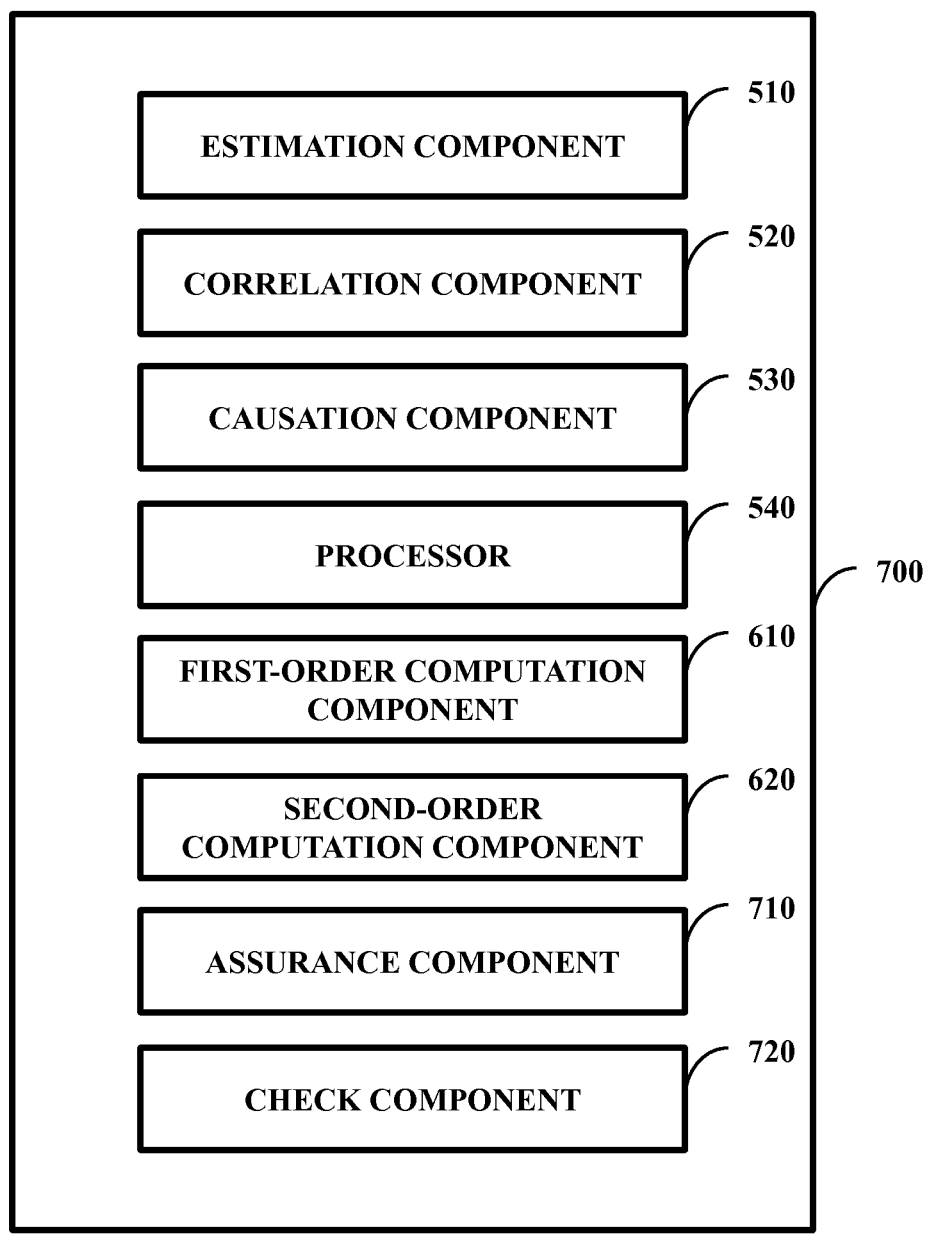
FIG. 7 illustrates one embodiment of a system comprising the estimation component, the correlation component, the causation component, the processor, the first-order computation component, the second-order computation component, an assurance component, and a check component.

FIG. 7 illustrates one embodiment of a system 700 comprising the estimation component 510, the correlation component 520, the causation component 530, the processor 540, the first-order computation component 610, the second-order computation component 620, an assurance component 710, and a check component 720. The assurance component 710 can be configured to assess a confidence level of the correlation being correct (e.g., a confidence level in that the key of the telephone number pad that the system 700 designates is the actual key communicated by the dual-tone frequency signal) or the estimation being correct. The check component 720 can be configured to establish if the confidence level meets a threshold, where the causation component 530 causes output of the character in response to the confidence level meeting the threshold or causes the correlation component 520 to operate in response to the confidence level meeting the threshold. The causation component 530 can be configured to report a failure if the confidence level for the key identified for the average does not meet the threshold (e.g., send out an error message).

In one embodiment, the correlation component 520 correlates the average by identifying a best matching frequency for the average on a frequency look-up table (e.g., the example table above) and identifying a candidate character that is associated with the best matching frequency. In one example, the correlation component 520 can individually compare the average with the sixteen average frequency entries of the example table as part of the correlation. This comparison can include performing a subtraction between the average and individual entries of the sixteen average frequency entries. The correlation component 520 can determine which of the sixteen average frequency entries has the smallest absolute value result from the subtraction as part of the correlation. The correlation component 520, as part of the correlation, can designate a key associated with the average frequency with the smallest absolute value result as the character and instruct the causation component 530 to cause output of the character. The causation component 530 can follow this instruction and cause output of the character.

Figure 8:
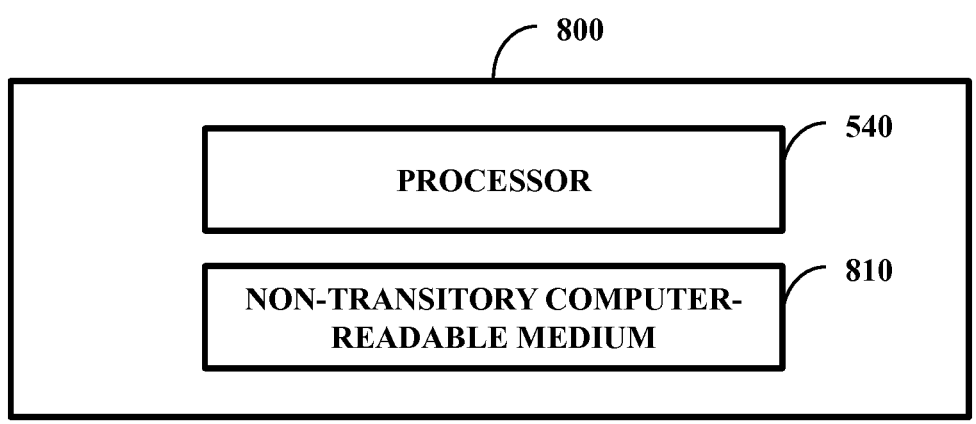
FIG. 8 illustrates one embodiment of a system comprising the processor and a non-transitory computer-readable medium.

FIG. 8 illustrates one embodiment of a system 800 comprising the processor 540 and a non-transitory computer-readable medium 810. In one embodiment the non-transitory computer-readable medium 810 is configured to store computer-executable instructions that when executed by the processor 540 cause the processor 540 to perform a method disclosed herein (e.g., at least part of at least one of the methods 900-1400 discussed below). In one embodiment the non-transitory computer-readable medium 810 is communicatively coupled to the processor 540 and stores a command set executable by the processor 540 to facilitate operation of at least one component disclosed herein.

Figure 9:
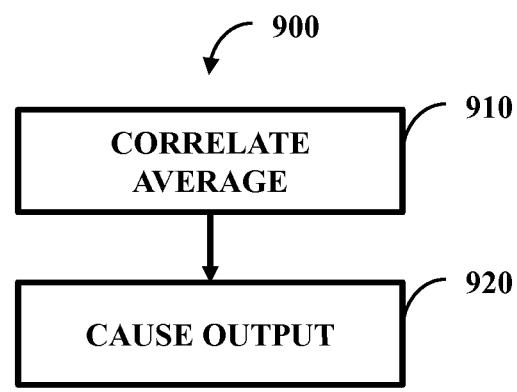
FIG. 9 illustrates one embodiment of a method comprising two actions.

FIG. 9 illustrates one embodiment of a method 900 comprising two actions 910-920. At 910 there is correlating an estimated average frequency of a dual-tone frequency signal with a key of a digital communication keypad (e.g., telephone keypad, keyboard, etc.). The dual-tone frequency signal can comprise a high frequency and a low frequency that is different from the high frequency and the average frequency can be an average of the high frequency and the low frequency. In one embodiment, this correlation is performed through employment of the example table discussed above. At 920 there is causing an output of the key after the correlation done at 910.

Figure 10:
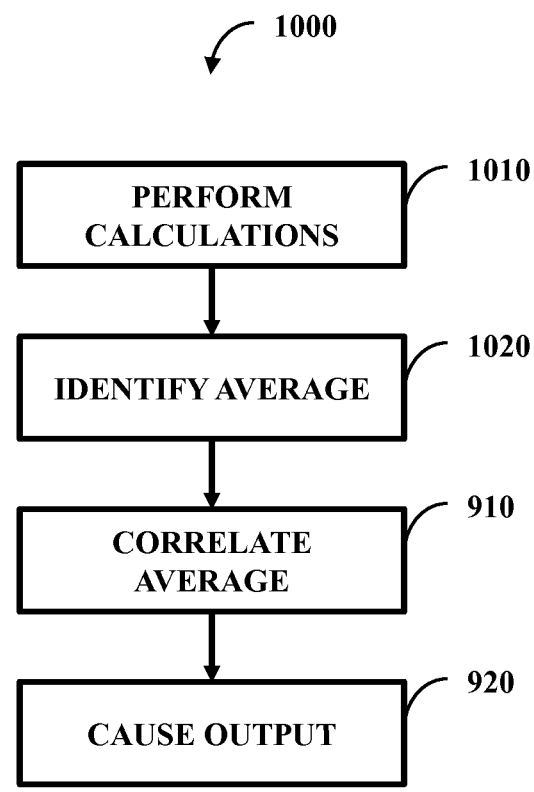
FIG. 10 illustrates one embodiment of a method comprising four actions.

FIG. 10 illustrates one embodiment of a method 1000 comprising four actions 910-920 and 1010-1020. At 1010 there can be performing of various calculations such as performing a calculation of a first-order statistic of the dual-tone frequency signal, where the first-order statistic includes the high frequency and the low frequency. One example calculation can include performing a calculation of a second-order statistic of the dual-tone frequency signal, where the second-order statistic includes the high frequency, the low frequency, and the estimated average frequency. A calculation can be performed at 1010 that includes a subtraction with the first-order statistic and the second-order statistic, where the subtraction causes isolation of the estimated average frequency from the high frequency and the low frequency. At 1020 identifying the estimated average frequency after isolation of the estimated average frequency can occur. At 910 correlation of the estimated average frequency can occur (e.g., after the estimated average frequency is identified at 1020) and at 920 output causation can occur.

Figure 11:
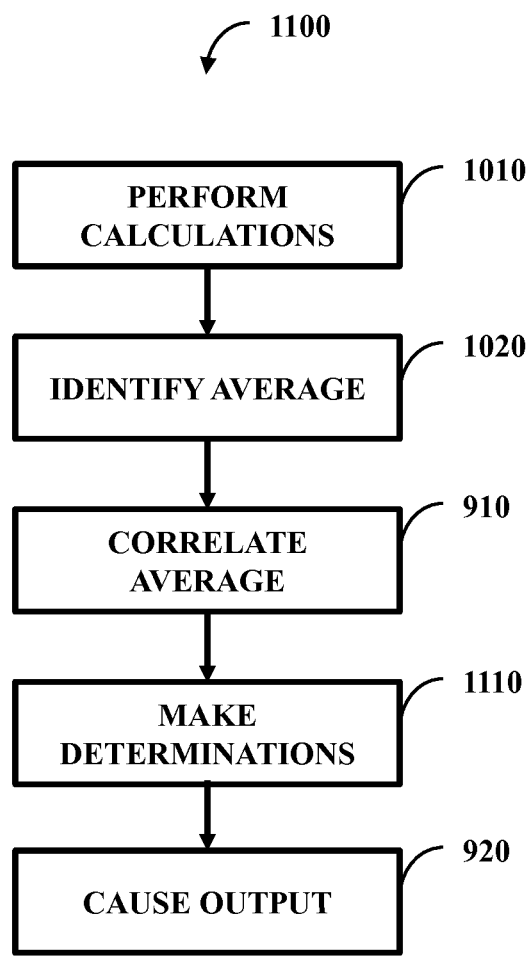
FIG. 11 illustrates one embodiment of a method comprising five actions.

FIG. 11 illustrates one embodiment of a method 1100 comprising five actions 910-920, 1010-1020, and 1110. At 1010, along with performing calculations there can be collecting the signal. At 1020, along with average identification other identification can occur (e.g., identify that a collected signal is dual-tone through use of the recognized frequencies). The average can be correlated at 910 and at 1110 there is determining a confidence level in the character correlated with the estimated average frequency. Also at 1110 there is determining if the confidence level meets a threshold (e.g., a designer defined threshold where the designer is a person), where the causing the output of the key at 920 occurs in response to determining that the confidence level meets the threshold. In one embodiment, if the threshold is not met then a subsequent attempt is made (e.g., the method returns to 1010, 1020, or 910). Subsequent attempts can include re-recognizing frequencies (e.g., in case they were incorrectly recognized the first time) or re-correlating (e.g., if there was an error with the original correlation).

In one embodiment, the estimated average frequency can be close to two average frequencies of the example table. The method 1100 can correlate, at 910, with a closer average frequency of the two, but this may result in a low confidence. The method 1100 can re-perform the correlation, returning to 910, with the less-close of the two close two average frequencies. The method 1100 can make the determinations at 1110 with the less close average frequency and if the confidence is high enough then action 920 can occur. In one embodiment, if the threshold is not met and/or a set number of key determination iterations are made (e.g., neither of the two close frequencies have enough confidence to be used), then an error report can be outputted at 920, where the error report indicates a key communicated by the dual-tone frequency signal is not able to be determined (e.g., the error report can indicate that two close average frequencies were correlated, but neither have a high enough confidence level).

In one embodiment, the dual-tone frequency signal is an information portion of a communication signal. In one embodiment, the dual-tone signal is a synchronizing signal and a repeating signal. In one embodiment, the dual-tone frequency signal from which the correlation is based is a processed dual-tone frequency signal subjected to band pass filtering and subjected to zero padding.

Figure 12:
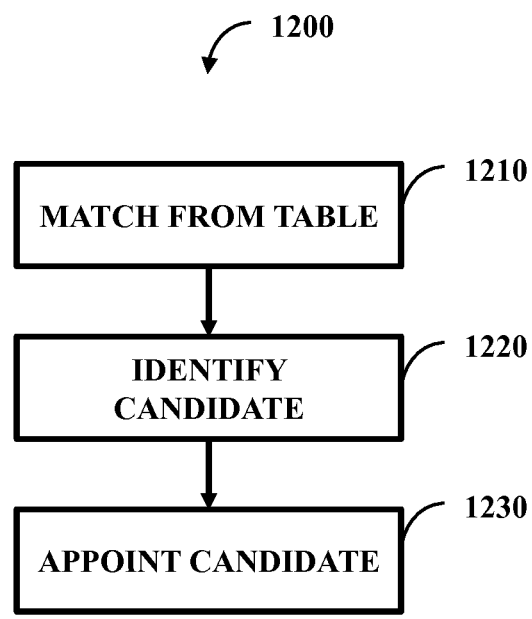
FIG. 12 illustrates one embodiment of a method comprising three actions.

FIG. 12 illustrates one embodiment of a method 1200 comprising three actions 1210-1230. The method 1200 can be how the average is correlated as discussed at 910 in FIGS. 9-11. At 1210 there is matching the estimated average frequency with a best matching frequency (e.g., of a frequency table such as the example table discussed above). At 1220 there is identifying a candidate key (e.g., each of the keys of the example table above are candidate keys until appointed) associated with the best matching frequency. At 1230 there is appointing the candidate key as the key.

Figure 13:
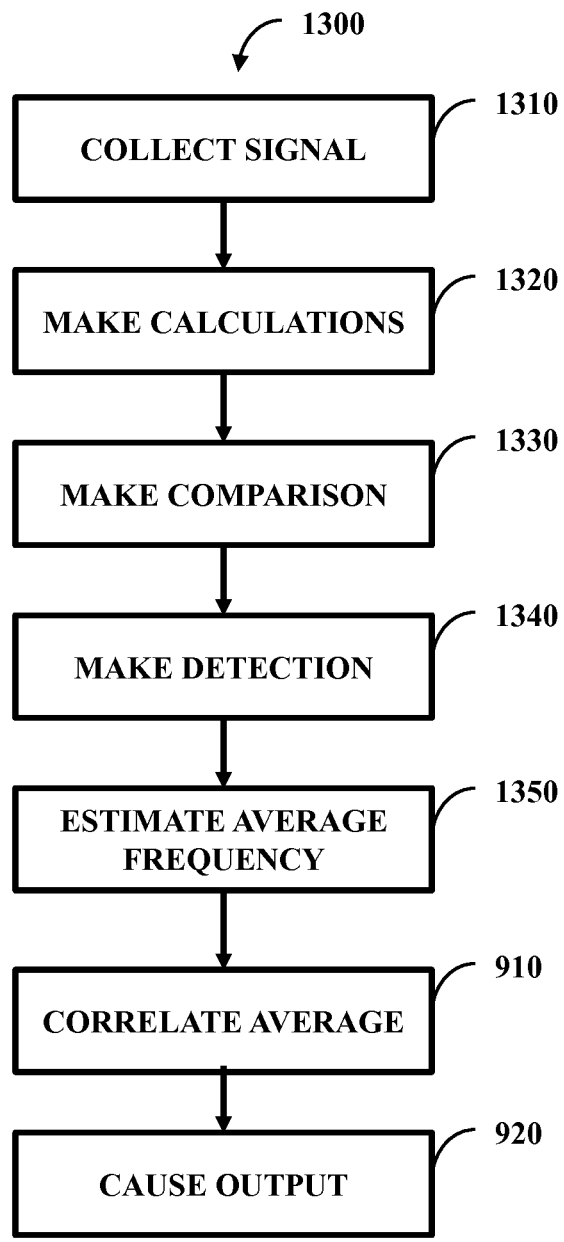
FIG. 13 illustrates one embodiment of a method comprising seven actions.

FIG. 13 illustrates one embodiment of a method 1300 comprising seven actions 1310-1350 and 910-920. At 1310 collecting a signal with an unknown classification can occur. At 1320 there can be various calculations made. These calculations can include calculating a first-order statistic of the dual-tone frequency signal, calculating a second-order statistic of the dual-tone frequency signal, calculating a spectral magnitude of the first-order statistic, as well as calculating a spectral magnitude of the second-order statistic. At 1330 there can be comparing the spectral magnitude of the first-order statistic with the spectral magnitude of the second-order statistic to produce a comparison result and at 1340 there can be detecting that the signal with the unknown classification is the dual-tone frequency signal through use of the comparison result. Thus, actions 1320-1340 can function to determine that an unknown signal is of a dual-tone multi-frequency signal type. In response to this, the method 1300 can made a determination on how to process the collected signal (e.g., move forward with actions 1350, 910, and 920). At 1350 there is estimating the estimated average frequency though combination of the first-order statistic and the second-order statistic, where the correlating the estimated average frequency at 910 and causing output at 920 occur after the estimating the estimated average frequency.

Figure 14:
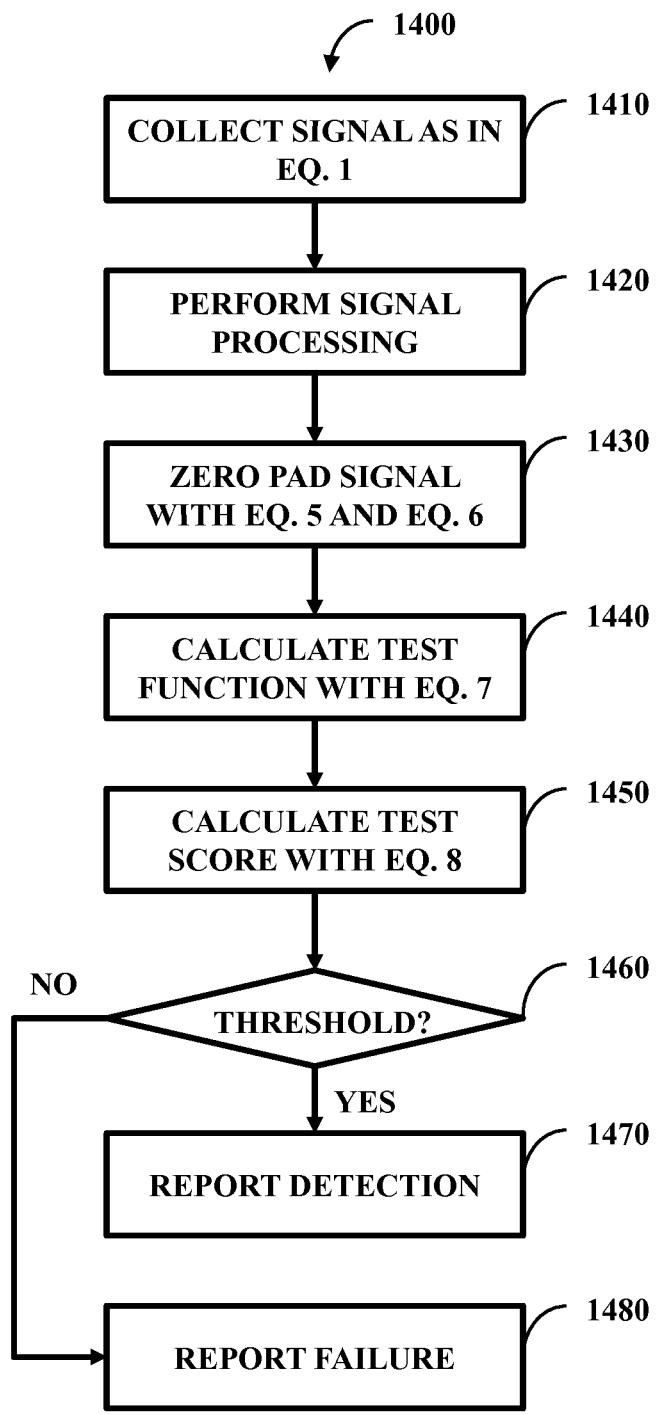
FIG. 14 illustrates one embodiment of a method comprising eight actions.

FIG. 14 illustrates one embodiment of a method 1400 comprising eight actions 1410-1480. A baseband dual-tone multi-frequency (DTMF) signal x(t) can be collected at 1410 and processed at 1420 (e.g., subjected to band pass filtering, sampling, and/or normalization). The baseband DTMF signal can be described as $$x(t) = a\cos(2\pi f_L t) + b\cos(2\pi f_H t) \quad (1)$$

where $f_L$ is the low frequency that can be chosen from 697 Hz, 770 Hz, 852 Hz, and 941 Hz (or other frequencies), and $f_H$ is the high frequency that can be chosen from 1209 Hz, 1336 Hz, 1477 Hz, and 1633 Hz (or other frequencies), and a and b are amplitudes. A first-order spectrum of x(t) can be defined as $$X_1(f) = \int_{-\infty}^{\infty} x(t) e^{-j2\pi ft} dt \quad (2)$$

and a second-order spectrum can be defined as $$X_2(f) = \int_{-\infty}^{\infty} x^2(t) e^{-j2\pi ft} dt \quad (3)$$

The first-order spectrum of Equation 2 can produce the first-order statistic discussed above and the second-order spectrum of Equation 3 can produce the second-order statistic discussed above. In the first-order spectrum, high magnitudes (e.g., peaks) can be observed at the lower frequency $f_L$ ranged between 697 Hz and 941 Hz and at the higher frequency $f_H$ ranged between 1209 Hz and 1633 Hz. A low magnitude (e.g., non-peaks) can be observed at the first-order middle frequency, or average frequency $$f_{ave} = \frac{f_L + f_H}{2}$$

at the middle of the lower and higher frequencies ranged between 953 Hz and 1287 Hz. In the second-order spectrum, the high magnitudes can be observed at 2 $f_L$ and 2 $f_H$, as well as the second-order middle frequency at $f_L + f_H$ (ranged between frequencies 1906 Hz and 2574 Hz). Therefore, the existence of DTMF can be detected by comparing the spectral magnitude of the first-order and second-order middle frequencies (e.g., as at least part of action 1330 of FIG. 13).

The signal x(t) can be normalized at 1420 to a=b=1 and digitized to samples described by $$x_m = \cos\left(2\pi f_L \frac{m}{f_s}\right) + \cos\left(2\pi f_H \frac{m}{f_s}\right) \quad (4)$$

$$k = 1, 2, \ldots, K$$

where $f_s$ is the sampling frequency (e.g., three or four times larger than the highest DTMF frequency). Equation 4 can be a digitized version of Equation 1. Zero padding can occur at 1430 which can include using the first-order and second-order statistics of $x_k$ that are defined by $$y_k = P(x_k^2) \quad k = 1, 2, \ldots, 2^N \quad (5)$$

$$z_k = P(x_k) \quad k = 1, 2, \ldots, 2^{N+1} \quad (6)$$

where the operator P stands for the zero padding operation. After zero padding, the data length of $z_k$ becomes twice of the length of $x_k$.

The amplitudes of the first and the second order spectral can be obtained using a Fast Fourier transform of $y_k$ and $z_k$, denoted by $Y_m$ and $Z_m$, respectively. Where $Z_m$ is the first-order spectrum associated to EQ. 2, m=1, ..., $2^N$, and $Y_m$ is the second-order spectrum associated to EQ. 3, m=1, ..., $2^{N+1}$. A test function (e.g., an estimation of the average frequency) can be generated at 1440 by taking the first $2^N$ frequency items from both $Y_m$ and $Z_m$ to form $$d_m = Z_m - 2Y_m \text{ for } m_{LB} \leq m \leq m_{HB} \quad (7)$$

where the index m is the same as the index used in $Z_m$, and $m_{LB}$ and $m_{HB}$ are corresponding to frequencies $f_{LB}$ and $f_{HB}$, respectively. The DTMF can be detected by searching for m=m_min such that $d_{m\_min}$ has a minimum magnitude (reversed spectral peak) in a given frequency domain. Thus a test score (e.g., that can be used to determine a confidence level) can be calculated at 1450 through use of:

$$d_{m\_min} = \arg\min_m (d_m), m_{LB} \leq m \leq m_{HB} \quad (8)$$

The test score $d_{m\_min}$ can also be used to be the confidence measurement of the detection. The more negative the value of $d_{m\_min}$, the higher confidence the detection decision can be.

Therefore, a threshold T (e.g., chosen by a designer) can be used to control the confidence of the detection, at 1460, as shown below:

$$d_{m\_min} < T \qquad (9)$$

Figure 15:
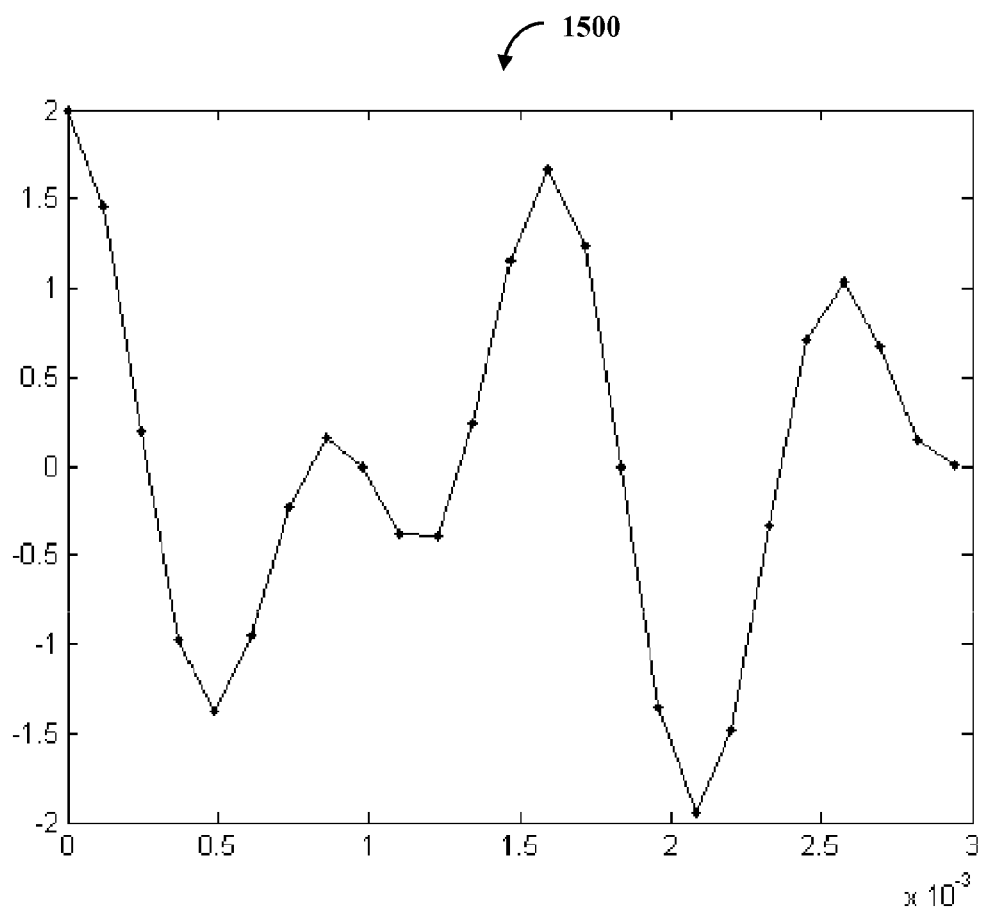
FIG. 15 illustrates one embodiment of a first graph.
Figure 16:
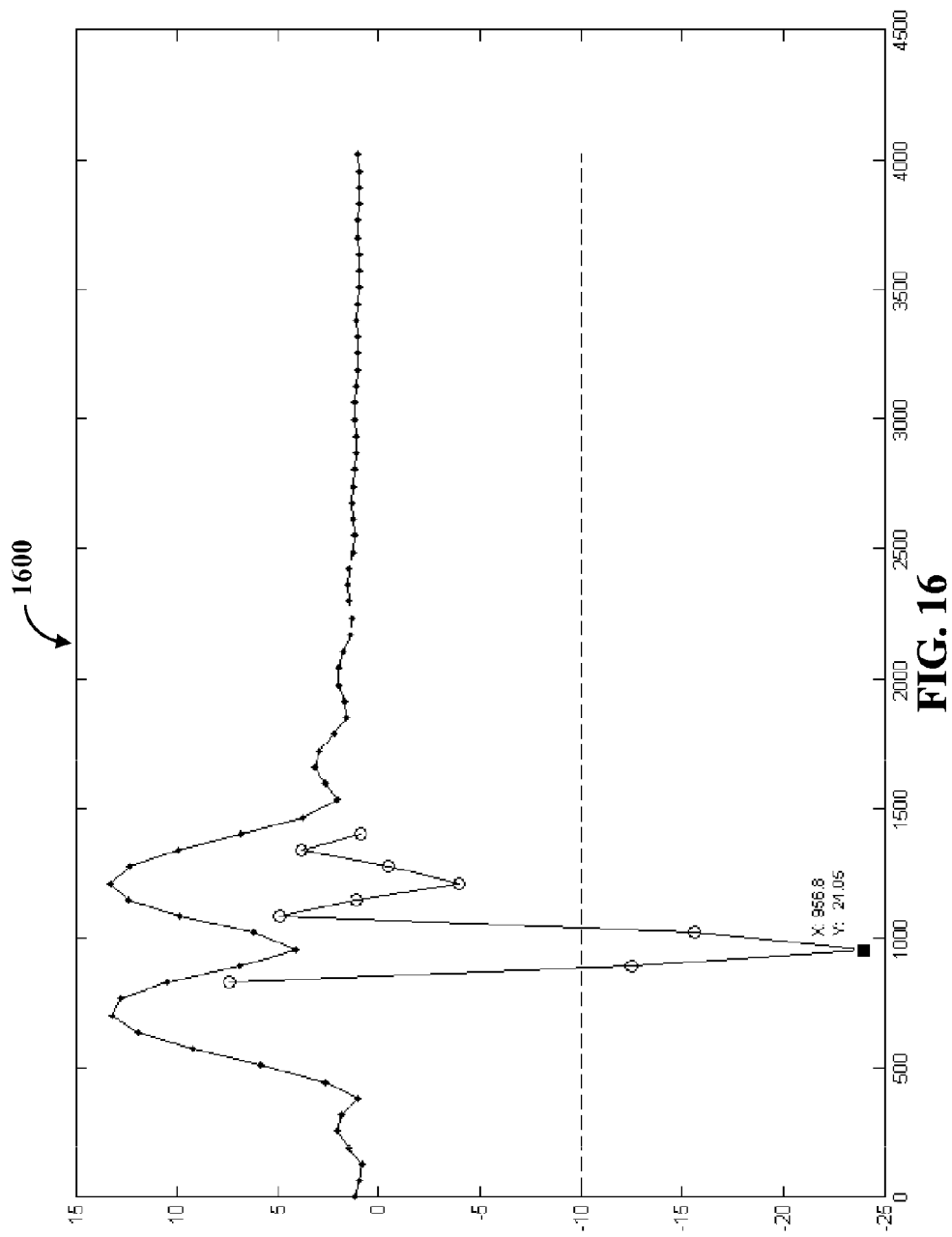
FIG. 16 illustrates one embodiment of a second graph.
Figure 17:
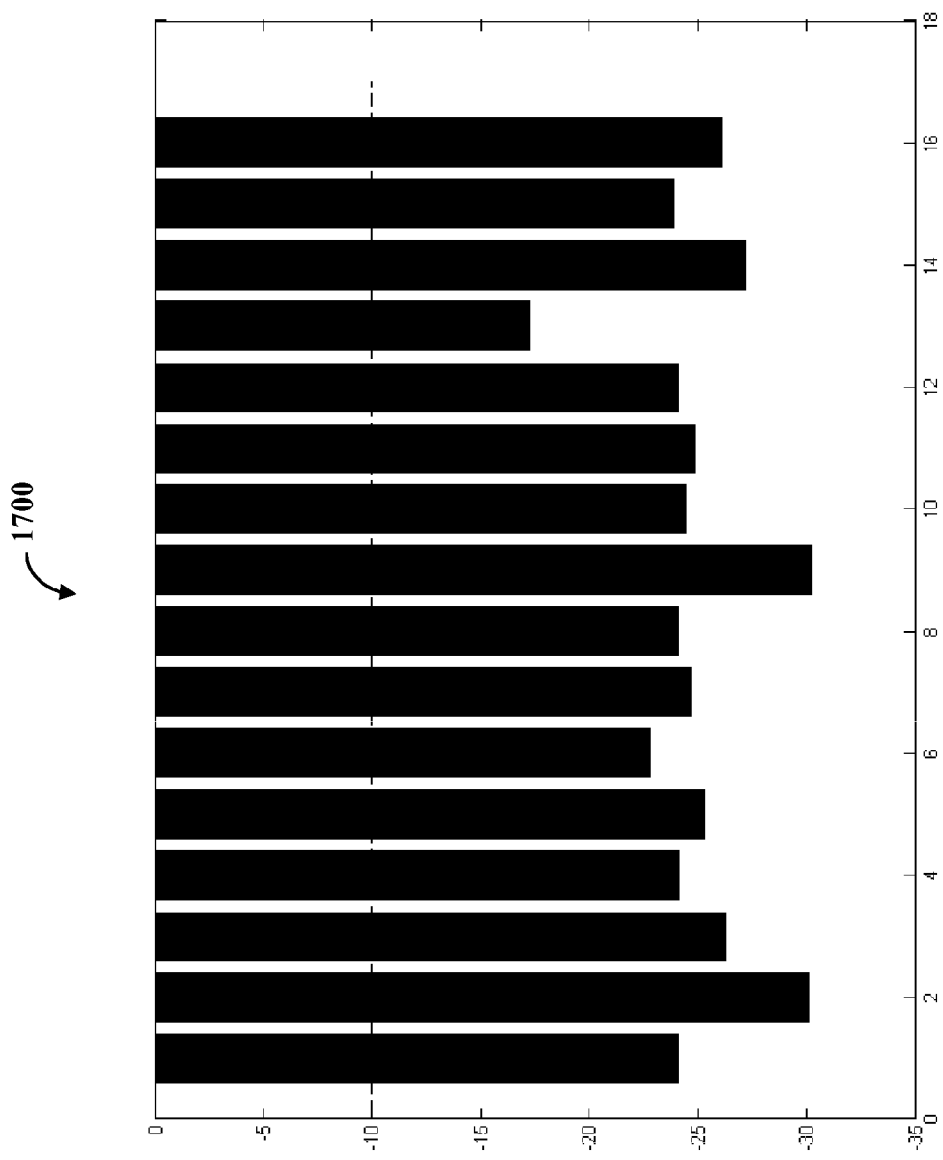
FIG. 17 illustrates one embodiment of a third graph.

The frequency associated to $d_{m\_min}$ is denoted by $f_{min}$ and is the test result contributed by both the first-order and second-order spectra to match a list of average frequency $f_{ave}$ in the example table, so that the DTMF is detected by a best match. In one example, if $d_{m\_min}$ is greater than T, then a successful detection is reported at 1470. Otherwise, a failure is reported at 1480. FIG. 15 illustrates one embodiment of a first graph 1500, FIG. 16 illustrates one embodiment of a second graph 1600, and FIG. 17 illustrates one embodiment of a third graph 1700. The graphs 1500-1700 show an example detection of potential DTMF keys: '1', '2', '3', 'A', '4', '5', '6', 'B', '7', '8', '9', 'C', '*', '0', '#', and 'D'. In the simulation, a DTMF signal described by EQ. 4 can generated from 0 to 3 milliseconds. The sampling frequency $f_s$ is 8,165 Hz with 25 $x_k$ samples. The value $y_k$ is obtained by extending the data length of $x_k^2$ to 64 samples and the value $z_k$ is obtained by extending $x_k$ to 128 samples using zero-padding. The threshold can be chosen as −10. The DTMF key '1' which is described by $$x_k = \cos\left(2\pi \cdot 697 \cdot \frac{k}{f_s}\right) + \cos\left(2\pi \cdot 1209 \cdot \frac{k}{f_s}\right)$$

and is plotted in the first graph 1400 of FIG. 14. The amplitudes of the first-order spectrum of key '1' are plotted as dots in the second graph 1600 of FIG. 16 and the values of the test function $d_m$ is calculated between, 14≤m≤23, which is associated with the frequency boundary between 829 Hz and 1403 Hz. The value of $d_m$ is plotted as circles in the second graph 1600 of FIG. 15. The minimum value, plotted as a square in the second graph 1600 of FIG. 15, is −24 at $f_{min}$=956.8 Hz which best matches the average frequency of 953 Hz in the example table and is smaller than the threshold of −10 at −24.05. Therefore the DTMF Key 1 is detected and a sufficient confidence is reached. Similar graphs can be produced for the remaining fifteen key and the third graph 1600 of FIG. 16 illustrates the scores for the sixteen DTMF keys, where the bars from left to right are scores corresponding to keys '1', '2', '3', 'A', '4', '5', '6', 'B', '7', '8', '9', 'C', '*', '0', '#', and 'D', and the dashed-line is the threshold (set at −10). The third graph 1700 of FIG. 17 shows that the scores are below the threshold so that all keys are successfully detected.

What is claimed is:

1. A signal processor unit, that is at least partially hardware, comprising:
 a first-order calculation component configured to calculate a first-order statistic of a multi-frequency signal that includes a high frequency of the multi-frequency signal and a low frequency of the multi-frequency signal;
 a second-order calculation component configured to calculate a second-order statistic of the multi-frequency signal that includes the high frequency of the multi-frequency signal, the low frequency of the multi-frequency signal, and an estimated average frequency of the multi-frequency signal;
 an identification component configured to identify the estimated average frequency of the multi-frequency signal through performance of a subtraction with the first-order statistic and the second-order statistic that isolates the estimated average frequency from the multi-frequency signal;
 a determination component configured to determine a character associated with the multi-frequency signal through use of the estimated average frequency; and
 an output component configured to output the character after the character is determined.

2. The signal processor unit of claim 1, where the multi-frequency signal is a dual-tone multi-frequency signal.

3. The signal processor unit of claim 2, where the character is a key of a telephone number pad.

4. The signal processor unit of claim 1, comprising:
 a match component configured to match the estimated average frequency with a best matching frequency of a frequency table, where the determination component is configured to determine the character associated with the multi-frequency signal through use of the best matching frequency.

5. The signal processor unit of claim 1, comprising:
 a confidence component configured to determine a confidence level of the character being correctly associated with the multi-frequency signal; and
 a comparison component configured to determine if the confidence level meets a threshold;
 where the output component is configured to output the character when the confidence level meets the threshold and configured to report a failure when the confidence level does not meet the threshold.

6. The signal processor unit of claim 1, where the multi-frequency signal is a synchronizing signal and a repeating signal.

7. The signal processor unit of claim 4,
 where the frequency table associates the best matching frequency with the character and
 where the determination component identifies the character through identification of the character associated with the best matching frequency.

8. A dual-tone frequency signal processor, comprising:
 a first-order computation component configured to compute a first-order statistic of a dual-tone frequency signal; and
 a second-order computation component configured to compute a second-order statistic of the dual-tone frequency signal,
 an estimation component configured to perform a comparison with the first-order statistic and the second-order statistic and configured to make an estimation of an average of a high frequency of the dual-tone frequency signal and a low frequency of the dual-tone frequency signal, where the estimation of the average is based, at least in part, on a result of the comparison;
 a correlation component configured to make a correlation of the average with a character; and
 a causation component configured to cause an output of the character.

9. The dual-tone frequency signal processor of claim 8, where the character correlates to a key of a telephone number pad.

10. The dual-tone frequency signal processor of claim 9, where the dual-tone frequency signal is an information portion of a communication signal and where the dual-tone frequency signal is a synchronizing signal and a repeating signal.

11. The dual-tone frequency signal processor of claim 10, comprising:
   an assurance component configured to assess a confidence level of the correlation being correct; and
   a check component configured to establish if the confidence level meets a threshold, where the causation component causes output of the character in response to the confidence level meeting the threshold.

12. The dual-tone frequency signal processor of claim 11, where the causation component is configured to report a failure if the confidence level does not meet the threshold.

13. The dual-tone frequency signal processors of claim 12, where the correlation component correlates the average by identifying a best matching frequency for the average on a frequency look-up table and identifying a candidate character that is associated with the best matching frequency.

14. A method performed, at least in part, by a signal detection component that is, at least in part, hardware, comprising:
   performing a calculation of a first-order statistic of a dual-tone frequency signal, where the first-order statistic includes a high frequency of the dual-tone frequency signal and a low frequency of the dual-tone frequency signal;
   performing a calculation of a second-order statistic of the dual-tone frequency signal, where the second-order statistic includes the high frequency, the low frequency, and an estimated average frequency of the dual-tone frequency signal;
   performing a calculation that includes a subtraction with the first-order statistic and the second-order statistic, where the subtraction causes isolation of the estimated average frequency from the high frequency and the low frequency;
   identifying the estimated average frequency after isolation of the estimated average frequency,
   correlating the estimated average frequency with a key of a digital communication keypad; and
   causing an output of the key after the correlation.

15. The method of claim 14, where correlating the estimated average frequency comprises:
   matching the estimated average frequency with a best matching frequency;
   identifying a candidate key associated with the best matching frequency; and
   appointing the candidate key as the key.

16. The method of claim 15, comprising:
   determining a confidence level in the key correlated with the estimated average frequency; and
   determining if the confidence level meets a threshold, where the threshold is designer defined and where causing the output of the key occurs in response to determining that the confidence level meets the threshold.

17. The method of claim 16, comprising:
   causing an output of an error report if the confidence level does not meet the threshold, where the dual-tone frequency signal is a processed dual-tone frequency signal subjected to band pass filtering and subjected to zero padding, where the dual-tone frequency signal is a portion of a communication signal, and where the dual-tone signal is a synchronizing signal and a repeating signal and where the causing the output of the key occurs before a decoding of the dual-tone frequency signal if such decoding occurs.

18. The method of claim 14, comprising:
   collecting a signal with an unknown classification;
   calculating a spectral magnitude of the first-order statistic;
   calculating a spectral magnitude of the second-order statistic;
   comparing the spectral magnitude of the first-order statistic with the spectral magnitude of the second-order statistic to produce a comparison result;
   detecting that the signal with the unknown classification is the dual-tone frequency signal through use of the comparison result; and
   estimating the estimated average frequency though combination of the first-order statistic and the second-order statistic, where the correlating the estimated average frequency occurs after the estimating the estimated average frequency.

19. The method of claim 18,
   where the dual-tone frequency signal is an information portion of a communication signal and
   where the dual-tone frequency signal is a synchronizing signal and a repeating signal.

20. The method of claim 15,
   where identifying the candidate key associated with the best matching frequency occurs, at least in part, through use of a table of keys.

* * * * *